United States Patent
Sumida et al.

(10) Patent No.: US 6,845,111 B2
(45) Date of Patent: Jan. 18, 2005

(54) LASER APPARATUS WITH IMPROVED THERMAL STRESS RESISTANCE

(75) Inventors: David S. Sumida, Los Angeles, CA (US); Hans W. Bruesselbach, Monte Nido, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/383,384

(22) Filed: Mar. 6, 2003

(65) Prior Publication Data

US 2004/0057480 A1 Mar. 25, 2004

Related U.S. Application Data

(60) Provisional application No. 60/412,284, filed on Sep. 20, 2002.

(51) Int. Cl.$^7$ ................................................. H01S 3/00
(52) U.S. Cl. ................................................. 372/36
(58) Field of Search ............................. 372/33–36, 75, 372/39

(56) References Cited

U.S. PATENT DOCUMENTS

| | | | |
|---|---|---|---|
| H001673 H | * 8/1997 | Hanson | 372/35 |
| 5,796,766 A | * 8/1998 | Hargis et al. | 372/36 |
| 5,846,638 A | 12/1998 | Meissner | 428/220 |
| 5,852,622 A | * 12/1998 | Meissner et al. | 372/39 |
| 6,144,484 A | * 11/2000 | Marshall | 359/333 |
| 6,347,109 B1 | * 2/2002 | Beach et al. | 372/75 |

* cited by examiner

Primary Examiner—Quyen Leung
(74) Attorney, Agent, or Firm—Ladas & Parry LLP

(57) ABSTRACT

A laser apparatus, comprising a layer fabricated of a lasing medium, the layer having a top surface and a bottom surface, and a first substrate layer fabricated of a laser-inactive material, the first substrate being diffusion-bonded to the layer of lasing medium, wherein the lasing medium comprises a crystalline, polycrystalline or glass material doped with ions. The lasing medium selected for fabrication of the laser apparatus of this invention comprises neodymium-doped yttrium vanadate material and laser-inactive material of the substrate comprises an yttrium-aluminate or yttrium vanadate material. The layers of material are oriented so that the thermal expansion coefficients along the crystallographic axes of the materials match or nearly match.

42 Claims, 3 Drawing Sheets

LASER APPARATUS WITH IMPROVED THERMAL STRESS RESISTANCE

CROSS-REFERENCE TO RELATED APPLICATIONS

This application claims benefit of U.S. Provisional Application No. 60/412,284 filed on Sep. 20, 2002, which is incorporated herein by reference in its entirety.

BACKGROUND

1. Field

This invention relates to the field of the crystalline materials to be used in fabrication of the disk, active mirror or other similar laser devices. More particularly, it pertains to the use of laser devices where an appropriately oriented optical substrate is diffusion-bonded to a lasing medium. Such implementation allows the resulting laser apparatus to be thermally loaded to much higher levels (compared to the levels usually used when the unbonded laser medium is directly attached to a heat sink) without risk of catastrophic failure of the device.

2. Description of Related Art

In prior art for face-pumped laser disks, which are typically pumped on one side and cooled on the other side, the laser medium is simply mounted directly to the metal heat sink, typically copper with an indium interface. Such a design is widely used and is well know to those skilled in the art.

In case of the design mentioned above, fracture will occur when the thermally induced tensile stress at one face reaches the surface tensile strength of the medium. For certain laser materials with poor thermomechanical properties, for instance, yttrium vanadate, such failure occurs even when the level of thermal loading is quite low. Thermal loads as low as a few watts per centimeter could be sufficient to cause the failure.

Typical failure modes for thermally loaded laser media occur when the surface stress is under tension and exceeds the tensile strength of the material. The failure normally happens when the temperature profile of the media is such that the surface is cooler than the bulk interior portion of the media. For the vast majority of media (those with a positive linear thermal expansion coefficient), this type of temperature profile creates a tensile stress at the surface as opposed to the compressive stress in the bulk interior. That is, the surface expands less than the bulk and, therefore, the bulk interior puts the surface under tension (i.e., the bulk interior is pulling the surface apart).

One way to address the thermal problem has been to face cool both sides of the laser medium with liquid or gas. This method is well known to those skilled in the art. The disadvantage of this method of cooling is that the laser optical path must transit through the cooling medium and, therefore, aberrations are imposed on the beam, thus degrading the beam quality of the laser output.

Another way to address the thermal problem is to diffusion-bond a dissimilar material of higher thermal conductivity and hardness to the weaker laser material. For example, neodymium-doped yttrium vanadate (Nd:YVO$_4$), has been bonded to Al$_2$O$_3$ (sapphire) but the extreme difference in linear thermal expansion coefficients between the two materials causes the YVO$_4$ material to cleave spontaneously, thereby limiting the ultimate size of the YVO$_4$. In particular, Onyx Optics, Inc. of Dublin, Calif., has diffusion bonded Nd:YVO$_4$ to sapphire with some limited success.

However, to date, the bonded interface size has been limited to several millimeters. This constraint is likely to exist due to the substantial difference in thermal expansion coefficients between the two materials, as well known to those skilled in the art.

Therefore, methods and devices known in the prior art have significant disadvantages and drawbacks, since it is not possible to scale the laser medium of previous designs to significantly larger sizes (for higher power devices) without the cleavage failure and, due to stress-induced cleavage failure, the prior art devices cannot be operated at increased level of pumping. Increased pumping is desirable to achieve, since it leads to increased power outputs.

Therefore, there exists a need in the art for a laser apparatus in which the laser medium can be scaled up to significantly larger sizes without the cleavage failure of previous designs.

SUMMARY

Therefore, it is an object of the present invention to provide a laser apparatus in which the laser medium can be scaled up to significantly larger sizes without the cleavage failure of previous designs. It is a further object of the present invention to provide an open face design where the medium is bonded on one side, or an enclosed sandwich design in which the medium is bonded on both sides with the cladding material.

It is an additional object of the present invention to allow for operation of the laser at reduced operating temperatures, thereby increasing the extraction efficiency and reducing the thermally induced Tensing and birefringence for certain materials and laser dopants.

It is a further object of the present invention to allow the laser medium of a laser apparatus to be pumped harder without stress-induced cleavage failure.

Another object of the present invention is to provide a laser apparatus having a lower cost, which is achieved by improving the gain per each disk and thereby obtaining a reduction in the number of elements in a multi-element laser.

It is well known that in an unclad disk, which is thermally loaded by being the active medium for a laser, the greatest stresses are at the surface of the disk. Fracture then initiates at whatever defects there are in the surface or subsurface regions.

Embodiments of the present invention provide that, by adding cladding to the laser disk, the disk's resistance to thermal fracture is greatly improved. Furthermore, the power handling capabilities of a laser incorporating such a disk are proportionally increased. Providing a substrate layer or cladding that is diffusion-bonded to the laser medium of the laser disk keeps the laser medium under compression at the substrate interface, which allows for more gain and more power output under higher pumping.

In particular, by diffusion bonding an optically transparent material to the surface of the substrate, a result is achieved that the surface starts experiencing compressive stress rather than tensile stress. This happens because the nonabsorptive substrate side of the diffusion bonded interface is cooler than the laser medium and therefore expands less (assuming the product of the thermal linear expansion coefficient and the temperature is the same or less than the laser medium). Thus, the present invention improves the thermal stress resistance of certain laser media by diffusion bonding the media to thermally stronger optical material.

In addition, the diffusion-bonded surface will protect the otherwise exposed surface of the laser medium from surface and subsurface flaws, which lead to catastrophic failure. As noted above, fracture generally initiates at the defects in the surface of unclad laser media. Thus, diffusion-bonding a substrate or cladding to the active medium further reduces the possibility of catastrophic failure.

Diffusion bonding of optical material is known in the art. In particular, the methods and techniques described in U.S. Pat. No. 5,846,638, incorporated herein by reference, may be used for diffusion bonding the substrate materials and laser media materials described herein. However, other methods and techniques, known to those skilled in the art, may also be used to bond the substrate materials and laser media materials.

The cladding or substrate material should be chosen so that it matches to the laser medium in terms of respective thermal linear expansion coefficients. In addition, the substrate preferably has a higher thermal conductivity and Young's modulus for better thermomechanical heat sinking characteristics. This allows for more robust attachment of the substrate material to a metal heat sink, unlike some prior art apparatus in which the bare laser medium is attached directly to the heat sink, requiring more delicate and complex attachment means. The higher thermal conductivity substrate helps to reduce temperature at the laser medium interface and, therefore, lower the overall temperature in the medium.

Embodiments of the present invention may be used to provide laser slabs, laser disks, active mirrors, and other similar laser devices.

According to a first aspect of the present invention, a laser apparatus is provided, comprising a disk fabricated of a lasing medium, the disk having a top surface and a bottom surface, and a first substrate fabricated of a laser-inactive material, the first substrate being diffusion-bonded to the disk, wherein the lasing medium of the disk comprises a crystalline, polycrystalline or glass material doped with ions.

According to a second aspect of the present invention, lasing medium selected for fabrication of the laser apparatus of this invention comprises neodymium-doped yttrium vanadate material and laser-inactive material of the substrate comprises an yttrium-aluminate material.

According to a third aspect of the present invention, a laser cavity system is provided, comprising a disk fabricated of a lasing medium, the lasing medium comprising a crystalline or glass material doped with ions, two substrates, each of the substrates fabricated of a laser-inactive material, wherein the disk is sandwiched between the two substrates by diffusion-bonding, a dichroic mirror, and a cold plate, one of the two substrates being disposed on a surface of the cold plate. The substrates may comprise different materials or they may comprise the same materials.

According to a fourth aspect of the present invention, the laser cavity mentioned above further comprises pump diodes close-coupled to the disk without using coupling optics.

BRIEF DESCRIPTION OF THE DRAWINGS

The features and advantages of the present invention will become better understood with regard to the following description, appended claims, and accompanying drawings where:

DETAILED DESCRIPTION OF PREFERRED EMBODIMENTS

Figure 1A:
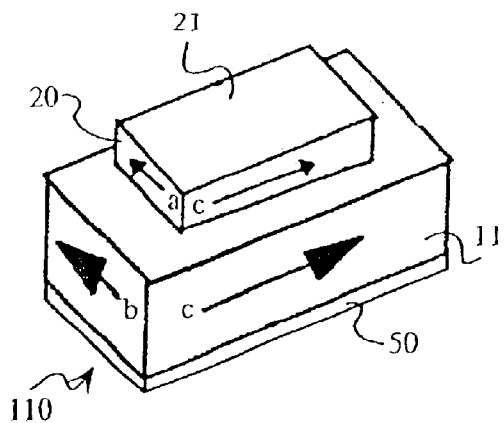
FIG. 1A is a schematic diagram showing an embodiment of the laser apparatus of the present invention comprising an active laser medium layer and a dissimilar material substrate layer.

In accordance with preferred embodiments of the present invention, any crystalline, polycrystalline or glass material can be used for the lasing medium. However, a preferred lasing medium is neodymilum-doped yttrium vanadate (Nd:YVO$_4$). Candidate substrates with higher thermal conductivities relative to YVO$_4$ include sapphire (Al$_2$O$_3$), yttrium-aluminum-garnet (YAG), magnesium fluoride (MgF$_2$), and yttrium-aluminate YAlO$_3$, (YALO) as shown in Table 1.

TABLE 1

COMPARISON OF THERMOMECHANICAL PROPERTIES OF CANDIDATE SUBSTRATES AND PREFERRED LASING MEDIUM MATERIAL

| MATERIAL | THERMAL CONDUCTIVITY, W/mK | YOUNG'S MODULUS (E) GPa | THERMAL LINEAR EXPANSION COEFFICIENT K$^{-1}$ |
|---|---|---|---|
| Sapphire | ~35 | 405 | $5.4 \times 10^{-5}$//a |
|  |  |  | $6.8 \times 10^{-5}$//c |
| YAG | 10 | 282 | $7.0 \times 10^{-6}$ |
| MgF$_2$ | 12 | 138 | $8.7 \times 10^{-6}$//a |
|  |  |  | $13.9 \times 10^{-6}$//c |
| YALO* | 11 | 208//a | $9.5 \times 10^{-6}$//a |
|  |  | 240//b | $4.3 \times 10^{-6}$//b |
|  |  | 300//c | $10.8 \times 10^{-6}$//c |
| YVO$_4$ | 5 | 150 | $4.4 \times 10^{-6}$//a |
|  |  |  | $11 \times 10^{-6}$//c |

*Space group Pbmn as defined in M. J. Weber, et. al., Appl. Phys. Lett., vol. 15, pp. 342–345 (1969). This definition is known to those skilled in the art and is a commonly used crystallographic definition.

For comparison purposes, the table provides the thermomechanical properties of YVO$_4$, which is a preferred lasing medium according to this invention, as mentioned above. Note also that Table 1 also shows the thermal linear expansion coefficient of the different crystallographic orientations of the crystalline materials shown in the table.

In order to have the best chance of a successful diffusion bond, the substrate material should be well matched to the laser medium in terms of its thermal linear expansion coefficient as noted above. Comparing the properties of the candidate substrate materials summarized in Table 1, one can see that when $YVO_4$ is chosen as a lasing medium, the best match between $YVO_4$ and a candidate substrate material, in terms of having the closest coefficients of thermal expansion, is to YALO. YALO is, therefore, selected as a preferred substrate for use with $YVO_4$. Materials other than YALO, but also having thermal linear expansion coefficients matching that of the lasing medium, can be used as alternative substrate materials. Those skilled in the art know what degree of matching is necessary between thermal linear expansion coefficients of the lasing medium and of the substrate material, and will select the substrate material accordingly. Preferably, the thermal linear expansion coefficients of the different materials should be within ten percent or less of each other. Ideally, the thermal linear expansion coefficients should be as close as possible in order to reduce any residual stress at the bond interface, as exemplified by the specific material choices taught herein.

Because YALO is biaxial, an important aspect of this invention is to ensure the proper crystallographic orientation of the YALO substrate to the $YVO_4$ laser medium for an optimal diffusion bond. There are two equivalent space groups to describe the YALO system, and the differences between the two groups are shown in Table 2.

TABLE 2

YALO CRYSTALLOGRAPHIC AXES

| Lattice Constants Å | Space Group: Pbmn | Space Group: Pmna |
|---|---|---|
| a | 5.18 | 5.33 |
| b | 5.33 | 7.375 |
| c | 7.375 | 5.18 |

An embodiment of a laser apparatus 10 according to the present invention is shown in FIG. 1A. The apparatus 10 in this embodiment preferably comprises a lasing medium layer 20 diffusion-bonded to a dissimilar material substrate layer 11 to provide a diffusion-bonded slab. The respective directions of the axes along which the crystals are oriented are shown as "a," "b," and "c." The apparatus 110 of the embodiment depicted on FIG. 1 is particularly designed to impart high fracture strength to the apparatus 10. The method of diffusion-bonding is preferably used to bond the respective surfaces of the substrate layer 11 and the lasing medium layer 20, the method being known to those skilled in the art. As noted above, some methods of diffusion-bonding are described in U.S. Pat. No. 5,846,638. The apparatus 10 may also additionally comprise a high reflectivity coating 50 that is deposited on the surface of the substrate layer 11 opposite the lasing medium layer 20. Materials used for high reflectivity surface coatings are well known in the art.

The Pbmn space group convention is adopted here per the Weber reference mentioned above. Based on this space group, the preferred embodiment of the laser structure shown in FIG. 1A is that the substrate layer 11 comprises YALO and the lasing medium layer 20 comprises Nd-doped $YVO_4$. In this embodiment, the c-axis of YALO is parallel to the c-axis of $YVO_4$ and the b-axis of YALO is parallel to the a-axis of $YVO_4$. The expansion coefficient match along the indicated axes between these materials is excellent, as seen in Table 1. In addition, YALO, compared to YAG, has a comparably strong Young's Modulus and has an even higher thermal conductivity, as is also shown in Table 1.

Given the availability of high-brightness, tighter-focusing diode pump arrays, the minimum pump spot size on the laser medium is governed by the minimum length (parallel to the c-axis) of the lasing medium layer 20 along the plane defined by the diffusion bond line. This minimum length over which the pump light is absorbed is set by the thermal load per unit length, which, in turn, is related to the fracture strength of the medium. Based on current state-of-the-art pump arrays, the minimum length of the lasing medium layer 20 is within a range of a few millimeters, and the thickness of the lasing medium layer 20 is preferably about 1 millimeter.

For a given pump array and laser doping level, the thermal load per unit length can be adjusted by either increasing the length, or reducing the thickness, or both. A thinner lasing medium layer is advantageous because it reduces the pump absorption and so reduces the thermal load and temperature gradient across thickness. In addition, the passive optical loss associated with scattering is also reduced since the lasing path length is less. On the other hand, a disadvantage of a thinner lasing layer is that there is less gain per slab segment and hence more slab segments are required for a given laser output power. In the apparatus depicted in FIG. 1A, the substrate layer 11 is typically thicker than the lasing medium layer 20. The ratio of the thickness of the substrate layer 11 to the lasing medium layer 20 represents a compromise between thermomechanical stress and the temperature gradient. Those skilled in the art will know how to determine this ratio of thicknesses in accordance with the desired design.

For the diffusion-bonded slab laser pump cavity apparatus 10, the limiting factor is the fracture strength of the overall structure and not just the active region. Bonding the active region of the lasing medium layer 20 with the undoped material of the substrate layer 11 improves the fracture strength of the active lasing region of the lasing medium layer 20 by passivating the interface surface. Diffusion bonding the lasing medium layer 20 to the substrate layer 11 inhibits both the formation and propagation of surface micro-cracks in the lasing medium layer 20 that might otherwise cause catastrophic fracture of the lasing medium layer 20.

Bonding the lasing medium layer 20 with the substrate layer 11, in addition to passivating the interface surface, also reduces tensile stress near the surface of the lasing medium layer 20 during steady state lasing. This is because the temperature in the bonding area of the substrate layer 11 will be lower than that of the active lasing region of the lasing medium layer 20, leading to less expansion in the substrate layer 11. Thus, the substrate layer 11 maintains a compressive force on the lasing medium layer 20. This compressive force is similar to that seen with tempered glass, such as Pyrex®, in which the glass surface is kept in compression, thereby resisting thermal stress fracture with high temperature gradients across the glass wall.

In addition, in the cases where the thermal expansion coefficient (TEC) of the substrate layer 11 is slightly less than the lasing medium layer 20, when the materials are diffusion bonded at elevated temperatures, then, at the reduced temperature of operation, the substrate layer 11 will have shrunken less and, therefore, will impose a tensile "pre-stress" on the lasing medium layer 20. Under pumping, the temperature of the lasing medium 20 will increase, undergo thermal expansion, and create a compressive stress component to the tensile pre-stressed interface. At a given pumping level, the pre-existing tensile stress will be fully compensated by the increased compressive stress, thus creating an ideal no-stress situation at the interface. Those skilled in the art of bonding know how to adjust this tensile pre-stress by varying the degree of bonding at elevated temperatures for a desired operating pumping point. Of course, as the pump power increases beyond that point, the net stress on the interface is even more compressive which makes the thermal load capability of the device even more robust against thermally induced failure.

Figure 1B:
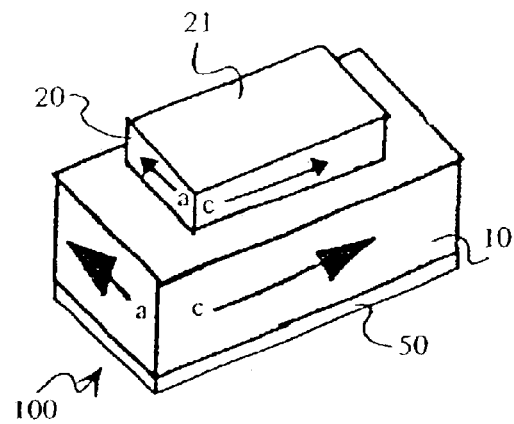
FIG. 1B is a schematic diagram showing an embodiment of the laser apparatus of the present invention comprising an active laser medium layer and a similar material substrate layer.

For moderate power applications, an alternative embodiment of the present invention may comprise a laser apparatus 100 comprising the lasing medium layer 20 diffusion-bonded to a similar material substrate layer 10. In this apparatus 100, the substrate layer 10 preferably comprises undoped material substantially similar to the material of the lasing layer 20, as shown in FIG. 1B. This embodiment of the present invention still provides the advantages that the bottom substrate layer 10 creates a compressive situation under pumping, and also provides mechanical protection of the optical surface as before, albeit with a weaker material as compared to the embodiment depicted in FIG. 1A. However, a further advantage of the embodiment depicted in FIG. 1B is the nearly perfect refractive index match at the interfacing surface between the lasing layer 20 and the substrate layer 10. This match reduces the Fresnel loss at the interface to nearly zero, thus improving the overall laser efficiency, since each interface is seen twice for every roundtrip bounce off of the highly reflective surface 50.

Additional embodiments of the laser apparatus of the present invention include the embodiments schematically illustrated in FIGS. 2, 3, 4A, and 4B. Note that FIGS. 1A, 1B, 2, 3, 4A and 4B illustrate laser slab embodiments of the present invention with a generally rectangular face shape. However, alternative embodiments of the present invention may comprise laser disks having circular or oval face shapes, or other laser devices comprising layers of bonded materials in a variety of shapes.

Figure 2:
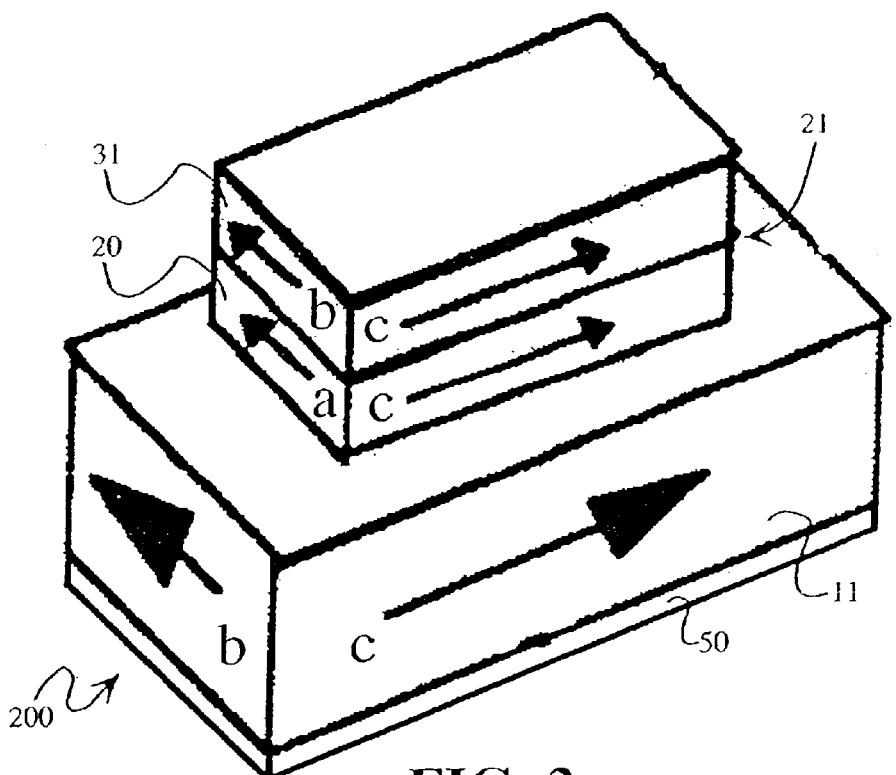
FIG. 2 is a schematic diagram showing an alternative embodiment of the laser apparatus of present invention comprising an active laser medium layer and substrate and capping layers made of similar materials.

For some higher power applications, it may be important to improve the fracture strength of the top surface 21 of the lasing medium layer 20 of the apparatus 100,110 shown in FIGS. 1A and 1B. In this case, an alternate embodiment of a laser apparatus 200, shown in FIG. 2, is used. According to this alternative embodiment, in addition to the substrate layer 11 and the lasing medium layer 20 combination, which combination is the same as in the embodiment 110 shown in FIG. 1A, a second diffusion bond is employed, attaching an undoped capping layer 31 to the top surface 21 of the lasing medium layer 20. The capping layer 31 preferably comprises the same material as the substrate layer 11 and has the same crystallographic orientation. The materials of the substrate layer 11 and the lasing medium layer 20 are, preferably, the same as described above. That is, the substrate layer 11 comprises undoped YALO and the lasing medium layer 20 comprises Nd-doped $YVO_4$. Therefore, the capping layer 31 also preferably comprises undoped YALO. The dimensions of the capping layer 31 should be substantially similar to those of the lasing medium layer 20 of the embodiment 10, described above. The method of diffusion-bonding is again preferably used to bond the surface of the capping layer 31 and the top surface 21 of the lasing medium layer 21. Also, the high reflectivity coating 50 may be deposited on the substrate layer 110, as described above.

Figure 3:
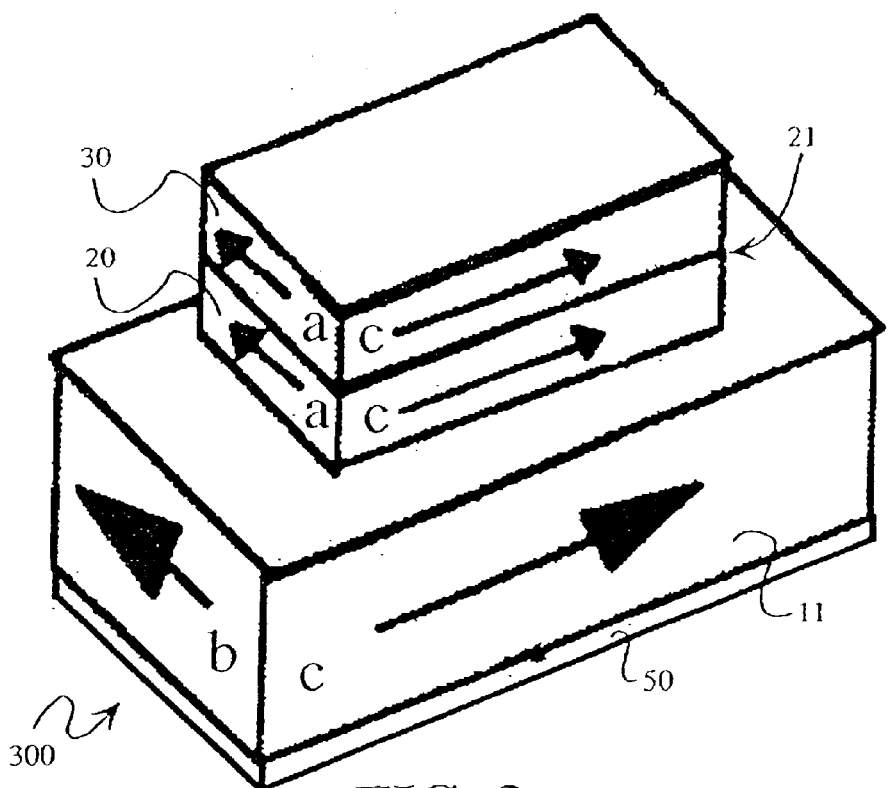
FIG. 3 is a schematic diagram showing another alternative embodiment of the laser apparatus of the present invention comprising an active laser medium layer and a capping layer made of similar materials and a substrate layer made of a dissimilar material.

Another alternative embodiment of the present invention is a laser apparatus 300 as shown in FIG. 3, in which the capping layer 30 comprising undoped material similar to the material of the lasing medium layer 20 is diffusion-bonded to the top surface 21 of the lasing medium layer 20. In this case, the thermal strength of the device 300 may not be as large as the laser apparatus 200 depicted in FIG. 2, but the similarity of material would be advantageous, as it will facilitate the fabrication process and is cost-efficient. In addition, a further advantage is the increase in laser efficiency due to the significantly reduced Fresnel loss from the near perfect refractive index match, as described for the embodiment depicted in FIG. 1B above. As described above, the preferred materials for this laser apparatus 300 also comprise undoped YALO for the substrate layer 11 and Nd doped $YVO_4$ for the lasing medium layer 20. Since the capping layer 30 preferably comprises the same material as the lasing medium layer 20, but undoped, the capping layer 30, therefore, preferably comprises undoped $YVO_4$. The high reflectivity coating 50 may also be deposited on the substrate layer 11 as described above.

Even though the undoped capping layer 30 may not be as strong as undoped capping layer 31 of the embodiment 200 depicted in FIG. 2, the laser apparatus 300 depicted in FIG. 3 is strengthened since the unconstrained top surface 21 of the lasing medium layer 20 is now encapsulated by the cooler non-active capping layer 30. This creates a compressive stress at the boundary between the two layers 20, 30 and thereby reduces the risk of thermally induced failure. Also, the benefit of a protective covering on the doped top surface 21 is maintained as well.

In the embodiments of the present invention depicted in FIGS. 1A, 1B, 2, and 3, additional advantages may be obtained by making the substrate layer 10 or 11 bigger in transverse dimensions than the lasing medium layer 20. This size difference then allows the laser apparatus to be mounted onto a heatsink by clamping down on the outer edges of the substrate layer 10 or 111 without imparting mechanical hold-down stress directly to the lasing medium layer 20. This capability allows for a greater clamping reliability without danger of mechanical failure to the lasing medium layer 20 as would otherwise be the case for an unbonded active lasing medium layer.

Figure 4A:
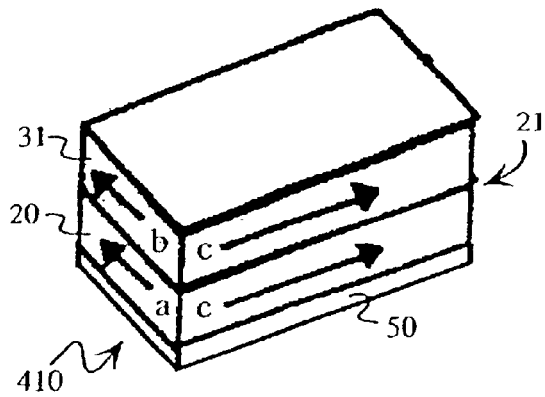
FIG. 4A is a schematic diagram showing yet another alternative embodiment of the laser apparatus of the present invention comprising an active laser medium layer and a capping layer made of a dissimilar material.
Figure 4B:
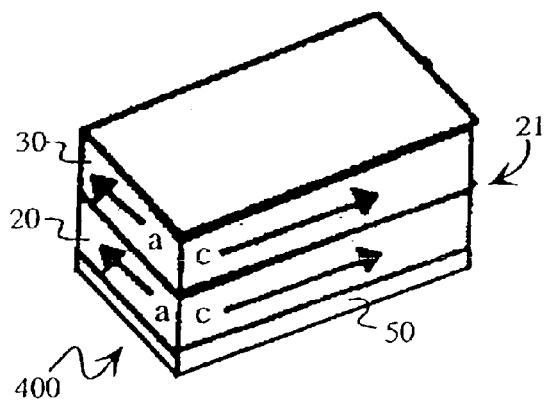
FIG. 4B is a schematic diagram showing yet another alternative embodiment of the laser apparatus of the present invention comprising an active laser medium layer and a capping layer made of similar material.

Other alternative embodiments of a laser apparatus 400, 410 according to the present invention are shown in FIGS. 4A and 4B. FIGS. 4A and 4B show apparatus that comprise a lasing medium layer and a capping layer. Specifically, FIG. 4A shows an apparatus 410 comprising only the lasing medium layer 20 and the capping layer 31, where the capping layer 31 comprises material different than the lasing medium layer 20. The lasing medium layer 20 here, as before, preferably comprises Nd-doped $YVO_4$, and the capping layer 31 preferably comprises undoped YALO, as before. Again, it is also preferred that the thermal linear expansion coefficients along the crystallographic axes of the two layers 20, 31 are well-matched. FIG. 4B depicts a laser apparatus 400 that comprises the lasing medium layer 20 and the capping layer 30, where the capping layer 30 comprises undoped material substantially similar to the material of the lasing medium layer 20. Preferably, for the apparatus 400 depicted in FIG. 4B, the lasing medium layer 20 comprises Nd-doped $YVO_4$ and the capping layer 30 comprises undoped $YVO_4$.

By removing the substrate layer 10 of previously discussed embodiments, this embodiment allows for minimal gradient of temperature, $\Delta T$, across the interface from bottom surface of lasing medium layer 20 to a heat sink coupled to the bottom surface. The capping layer 30 or 31 provides added strength at the hotter top surface 21 of the lasing medium layer 20, as described above.

Also, this embodiment allows the high reflectivity coating 50 to be deposited directly onto the lasing medium layer 20 for the lowest intra-cavity loss situation possible, instead of the usual application of the high reflectivity coating on the bottom substrate layer. In that usual case, added intracavity losses occur at the diffusion-bonded boundary between the doped lasing medium layer 20 and the undoped substrate layer 10 due to differences in the refractive index of the two materials, as noted above.

The laser apparatus 100, 110, 200, 300, 400 and 410 discussed above, can be utilized in laser cavities in a variety of ways. One laser cavity embodiment using a laser apparatus according to the present invention is depicted in FIGS. 5 and 5A.

Figure 5:
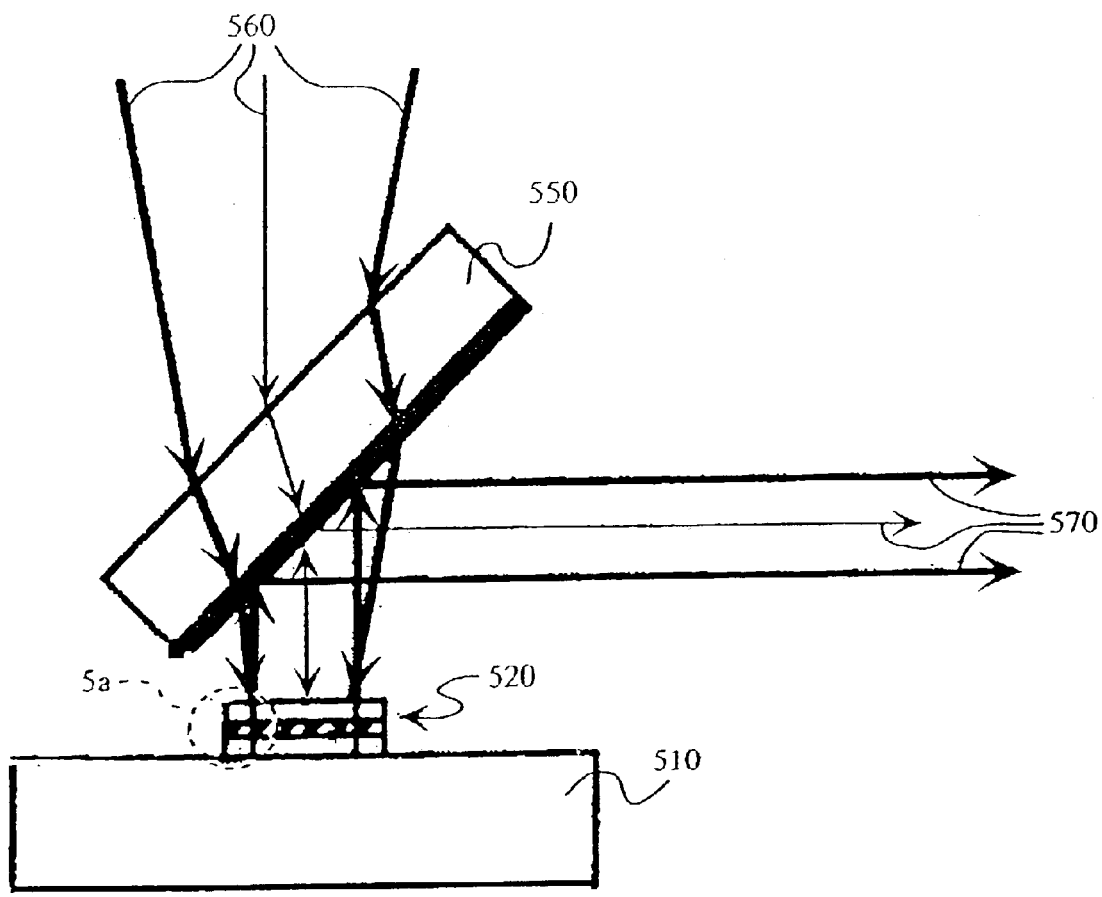
FIG. 5 is a schematic diagram showing an example of laser resonator utilizing the laser apparatus of this invention.
Figure 5A:
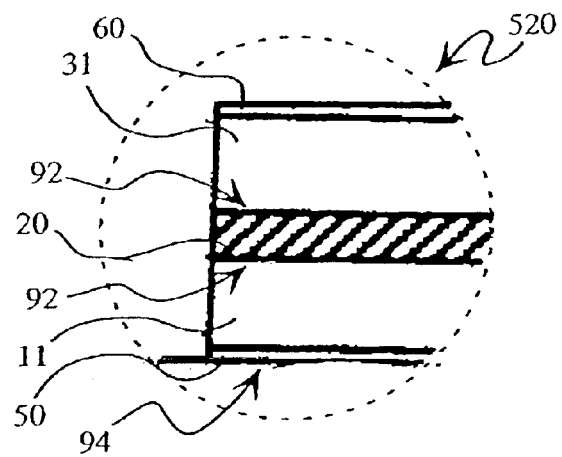
FIG. 5A is a schematic diagram showing the structure of the laser device used in the laser resonator depicted on FIG. 5.

FIG. 5 shows a laser cavity system 500, comprising a dichroic mirror 550 separating the pump diode beam 560 from the laser output energy 570. The pump diode beam 560 is focused down into the laser medium 20 of the laser apparatus 520, shown in FIG. 5A. The laser apparatus 520 is built according to the embodiment 200, and comprises two undoped substrates 11, 31, between which the active lasing medium layer 20 is sandwiched. The preferred materials for the layers are those previously described, that is, the substrate layer 11 and the capping layer 31 comprise undoped YALO and the lasing medium layer 20 comprises Nd doped $YVO_4$.

Layers 11 and 20 and layers 20 and 31 are coupled with diffusion bonds 92. The capping layer 31 is coated with an anti-reflective coating 60, and the substrate layer 11 is coated with the highly reflective coating 50. The anti-reflective coating 60 and the highly reflective coating 50 are those typically used with laser apparatus. Materials used for the coatings and the manner in which to apply the coatings are known to those skilled in the art. The surface coated with the highly reflective coating 50 is disposed on a cold plate 510 to form a thermal interface 94. The total thickness of the laser apparatus 520 is preferably about 2 millimeters. The advantage of laser cavity system 500, shown in FIGS. 5 and 5a is the excellent modal overlap of the pump and the laser modes.

From the foregoing description, it will be apparent that the present invention has a number of advantages, some of which have been described herein, and others of which are inherent in the embodiments of the invention described or claimed herein. Also, it will be understood that modifications can be made to the apparatus and method described herein without departing from the teachings of subject matter described herein. As such, the invention is not to be limited to the described embodiments except as required by the appended claims.

What is claimed is:

1. A laser apparatus, comprising:
   a lasing layer fabricated of an active lasing medium, said lasing layer having an upper surface and a lower surface; and
   a substrate layer having an upper surface and a lower surface, the upper surface of said substrate layer being diffusion-bonded to the lower surface of said lasing layer, said substrate layer being laser inactive,
   wherein:
   said laser apparatus has a first apparatus axis and a second apparatus axis being in a plane defined by said lasing layer and said first apparatus axis being perpendicular to said second apparatus axis;
   said lasing layer having a first lasing layer thermal expansion coefficient in a direction defined by said first apparatus axis and having a second lasing layer thermal expansion coefficient in a direction defined by said second apparatus axis;
   said substrate layer having a first substrate layer thermal expansion coefficient in a direction defined by said first apparatus axis and having a second substrate layer thermal expansion coefficient in a direction defined by said second apparatus axis; and
   said first lasing layer thermal expansion coefficient being matched to said first substrate layer thermal expansion coefficient and said second lasing layer thermal expansion coefficient being matched to said second substrate layer thermal expansion coefficient.

2. The laser apparatus of claim 1, wherein said substrate layer and said lasing layer comprise dissimilar materials.

3. The laser apparatus of claim 1, wherein said active lasing medium comprises a material that is doped and said substrate layer comprises the same material, the material of said substrate layer being undoped.

4. The laser apparatus of claim 1, wherein said first lasing layer thermal expansion coefficient is within ten percent of said first substrate layer thermal expansion coefficient and said second lasing layer thermal expansion coefficient is within ten percent of said second substrate layer thermal expansion coefficient.

5. The laser apparatus of claim 1, wherein said active lasing medium comprises crystalline, polycrystalline or glass material doped with ions.

6. The laser apparatus of claim 1, wherein said substrate layer comprises undoped crystalline, polycrystalline, or glass material.

7. The apparatus as claimed in claim 5, wherein said crystalline, polycrystalline, or glass material comprises yttrium vanadate.

8. The apparatus as claimed in claim 5, wherein said ions comprise ions of neodymium.

9. The apparatus as claimed in claim 6, wherein said substrate layer comprises yttrium-aluminate or yttrium vanadate.

10. The apparatus as claimed in claim 1, further comprising a capping layer, said capping layer being diffusion-bonded to the upper surface of said lasing layer.

11. The apparatus as claimed in claim 10, wherein said capping layer comprises laser-inactive material.

12. The apparatus as claimed in claim 10, wherein said capping layer and the substrate layer comprise the same material.

13. The apparatus as claimed in claim 10, wherein said active lasing medium comprises a material that is doped and said capping layer comprises the same material, the material of said capping layer being undoped.

14. The apparatus as claimed in claim 11, wherein said laser-inactive material of said capping layer comprises yttrium-aluminate.

15. The apparatus as claimed in claim 11, wherein said laser-inactive material comprises undoped yttrium vanadate.

16. The apparatus as claimed in claim 1, further comprising a highly reflective coating applied to the lower surface of said substrate layer.

17. The laser apparatus of claim 10, wherein:
   said capping layer having a first capping layer thermal expansion coefficient in a direction defined by said first apparatus axis and having a second capping layer thermal expansion coefficient in a direction defined by said second apparatus axis; and
   said first lasing layer thermal expansion coefficient being matched to said first capping layer thermal expansion coefficient and said second lasing layer thermal expansion coefficient being matched to said second capping layer thermal expansion coefficient.

18. The laser apparatus of claim 1, wherein said substrate layer is larger in a lateral direction, a longitudinal direction, or both lateral and longitudinal directions than said lasing layer.

19. A laser apparatus, comprising:
a lasing layer fabricated of an active lasing medium, said lasing layer having an upper surface and a lower surface; and
a capping layer, the capping layer being diffusion-bonded to the upper surface of said lasing layer, said capping layer being laser inactive,
wherein
said laser apparatus has a first apparatus axis and a second apparatus axis being in a plane defined by said lasing layer and said first apparatus axis being perpendicular to said second apparatus axis;
said lasing layer having a first lasing layer thermal expansion coefficient in a direction defined by said first apparatus axis and having a second lasing layer thermal expansion coefficient in a direction defined by said second apparatus axis;
said capping layer having a first capping layer thermal expansion coefficient in a direction defined by said first apparatus axis and having a second capping layer thermal expansion coefficient in a direction defined by said second apparatus axis; and
said first lasing layer thermal expansion coefficient being matched to said first capping layer thermal expansion coefficient and said second lasing layer thermal expansion coefficient being matched to said second capping layer thermal expansion coefficient.

20. The laser apparatus of claim 19, wherein said capping layer and said lasing layer comprise dissimilar materials.

21. The laser apparatus of claim 19, wherein said active lasing medium comprises a material that is doped and said capping layer comprises the same material, the material of said capping layer being undoped.

22. The laser apparatus of claim 19, wherein said first lasing layer thermal expansion coefficient is within ten percent of said first capping layer thermal expansion coefficient and said second lasing layer thermal expansion coefficient is within ten percent of said second capping layer thermal expansion coefficient.

23. The laser apparatus of claim 19, wherein said active lasing medium comprises crystalline, polycrystalline or glass material doped with ions.

24. The laser apparatus of claim 19, wherein said capping layer comprises undoped crystalline, polycrystalline, or glass material.

25. The apparatus as claimed in claim 23, wherein said crystalline, polycrystalline, or glass material comprises yttrium vanadate.

26. The apparatus as claimed in claim 23, wherein said ions comprise ions of neodymium.

27. The apparatus as claimed in claim 24, wherein said capping layer comprises yttrium-aluminate or yttrium vanadate.

28. The apparatus as claimed in claim 19, further comprising a highly reflective coating applied to the lower surface of said lasing layer.

29. A method for improving the thermal stress resistance of laser media, said method comprising the steps of:
providing an active lasing medium layer, the active lasing medium comprising doped crystalline, polycrystalline, or glass material;
providing a laser-inactive material layer, the laser inactive material comprising undoped crystalline, polycrystalline, or glass material; and
diffusion-bonding said active lasing medium layer to said laser-inactive material layer,
wherein the active lasing medium layer has thermal expansion coefficients directed in a lateral direction and a longitudinal direction and the laser-inactive material has thermal expansion coefficients directed in both said lateral direction and a longitudinal direction, and said method further comprises:
selecting an active lasing medium and a laser-inactive material with thermal expansion coefficients that match in both the lateral direction and the longitudinal direction; and
aligning said layers before diffusion-bonding so that the lateral direction and the longitudinal direction of said layers are parallel.

30. The method of claim 29, the thermal expansion coefficient in the lateral direction of the active lasing medium layer is within ten percent of the thermal expansion coefficient in the lateral direction of the laser-inactive material layer and thermal expansion coefficient in the longitudinal direction of the active lasing medium layer is within ten percent of the thermal expansion coefficient in the longitudinal direction of the laser-inactive material layer.

31. The method of claim 29, wherein the active lasing medium layer comprises neodymium doped yttrium vanadate.

32. The method of claim 29, wherein the laser inactive material layer comprises yttrium-aluminate.

33. The method of claim 29, further comprising:
providing a capping layer, said capping layer comprising laser inactive material; and
diffusion-bonding said capping layer on a side of said active lasing medium layer opposite said laser inactive material layer.

34. The method of claim 33, wherein said capping layer comprises undoped yttrium-aluminate or undoped yttrium vanadate.

35. The method of claim 29, further comprising:
providing a capping layer, said capping layer comprising laser in-active material, said capping layer having thermal expansion coefficients directed in a lateral direction and a longitudinal direction;
selecting the laser in-active material of said capping layer with thermal expansion coefficients that match the thermal expansion coefficients of the active lasing medium; and
diffusion-bonding the capping layer to the active lasing medium layer so that the lateral and longitudinal directions of the capping layer and the active lasing medium layer are parallel.

36. The method of claim 35, wherein the thermal expansion coefficient in the lateral direction of the active lasing medium layer is within ten percent of the thermal expansion coefficient in the lateral direction of the capping layer and thermal expansion coefficient in the longitudinal direction of the active lasing medium layer is within ten percent of the thermal expansion coefficient in the longitudinal direction of the capping layer.

37. A laser cavity system, comprising:
a dichroic mirror;
a cold plate, and
a laser apparatus adapted to receive light energy from said dichroic mirror and transmit laser energy to said dichroic mirror, said laser apparatus disposed on said cold plate, said laser apparatus comprising:

a lasing layer fabricated of a lasing medium, said lasing medium comprising a crystalline, polycrystalline or glass material doped with ions;

a substrate layer fabricated of laser inactive material, said substrate layer disposed on said cold plate and diffusion-bonded to said lasing layer; and a capping layer fabricated of laser in-active material, said capping layer disposed between said lasing layer and said dichroic mirror and diffusion-bonded to said lasing layer.

38. The laser cavity system as claimed in claim 37, wherein said lasing medium comprises yttrium vanadate.

39. The laser cavity system as claimed in claim 37, wherein said ions comprise ions of neodymium.

40. The laser cavity system as claimed in claim 37, wherein said laser-inactive material of said substrate layer and said capping layer comprises yttrium-aluminate.

41. The laser cavity system as claimed in claim 37, wherein a surface of said capping layer between said capping layer and said dichroic mirror is coated with an anti-reflective coating.

42. The laser cavity system as claimed in claim 37, wherein a surface of said substrate layer between said substrate layer and said cold plate is coated with a highly reflective coating.

* * * * *